C. A. MILLER.
TRAVEL RECORDER FOR AUTOMOBILES AND SIMILAR VEHICLES.
APPLICATION FILED NOV. 26, 1907.
963,055.
Patented July 5, 1910.
2 SHEETS—SHEET 1.
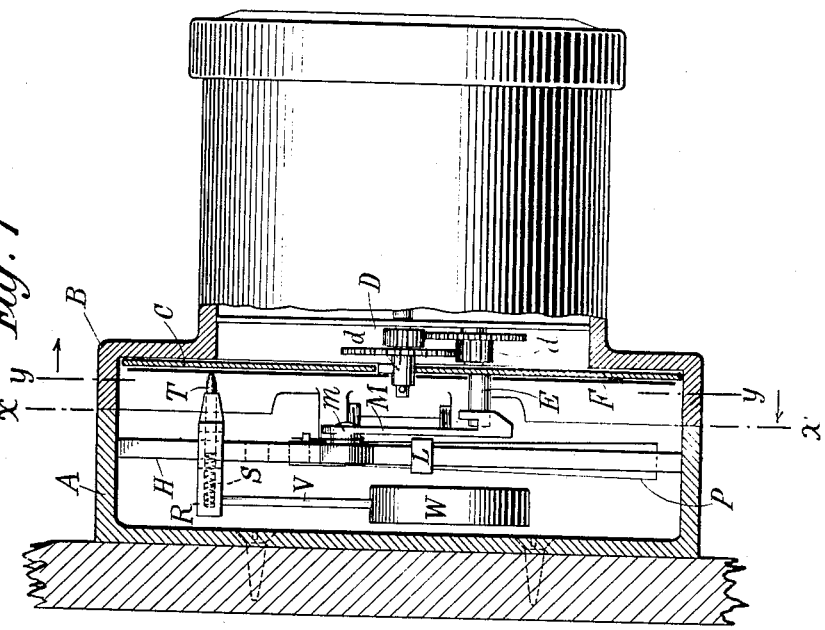
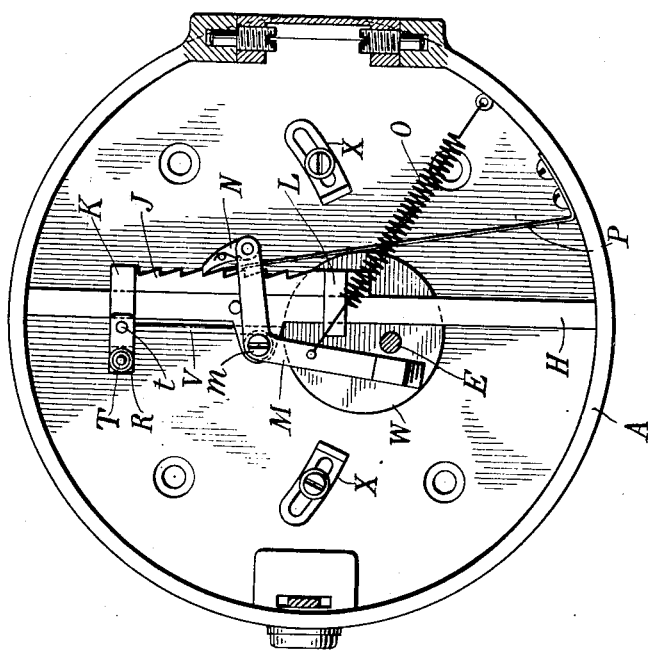
Witnesses:
Raphael Netter
A. S. Dunham
Charles A. Miller, Inventor
By his Attorneys
Kerr, Page & Cooper C. A. MILLER.
TRAVEL RECORDER FOR AUTOMOBILES AND SIMILAR VEHICLES.
APPLICATION FILED NOV. 26, 1907.
963,055.
Patented July 5, 1910.
2 SHEETS—SHEET 2.
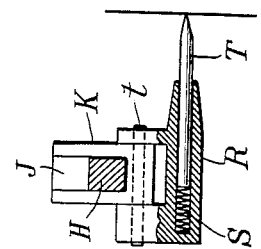
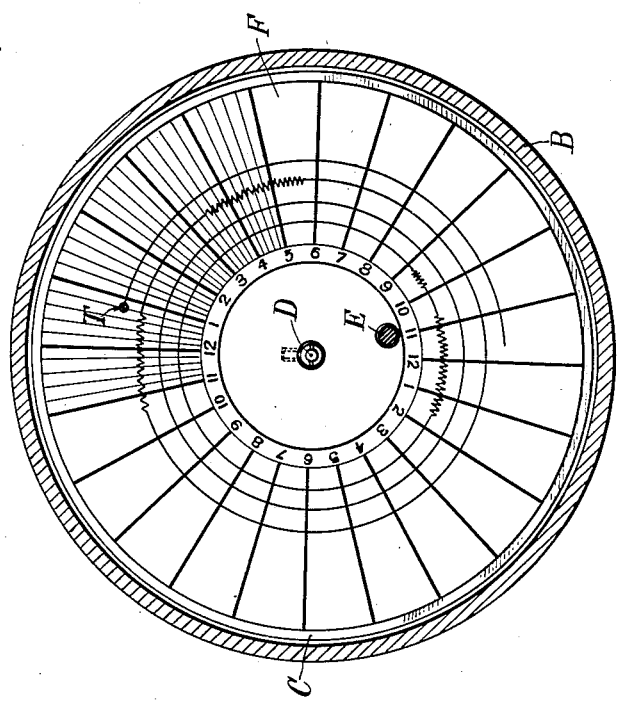
Witnesses:
Raphael Netter
A.L. Dunham
Charles A. Miller, Inventor
By his Attorneys
Kerr, Page & Cooper

UNITED STATES PATENT OFFICE.

CHARLES A. MILLER, OF HAZLETON, PENNSYLVANIA.

TRAVEL-RECORDER FOR AUTOMOBILES AND SIMILAR VEHICLES.

963,055.         Specification of Letters Patent.     Patented July 5, 1910.

Application filed November 26, 1907. Serial No. 403,943.

*To all whom it may concern:*

Be it known that I, CHARLES A. MILLER, a citizen of the United States, residing at Hazleton, in the county of Luzerne and State of Pennsylvania, have invented certain new and useful Improvements in Travel-Recorders for Automobiles and Similar Vehicles, of which the following is a specification, reference being had to the drawings accompanying and forming a part of the same.

The subject of my present application for Letters Patent is an instrument for use with an automobile or other vehicle to indicate and record the time during which it is in use, or in general, all movements of the vehicle to which it may be attached, the time and duration of such movements, and in a measure, other indications, such as the character of the road over which the vehicle has traveled.

Combined clock and recording mechanisms for indicating the movements of various kinds of vehicles are not broadly new, but heretofore in all such cases, so far as I am aware, the operation of the recording mechanism is dependent upon and effected by some form of connection between the recording device and the wheels or axles of the vehicle. This plan while entirely feasible and accurate lacks the desirable feature of security against the skill of dishonest chauffeurs or drivers, who by disconnecting the recorder from the running gear are enabled to use the car or vehicle without recording its travel.

The primary object of my invention is to provide a recorder for this purpose the operation of which is wholly independent of any connection with the running gear, and effected solely by those oscillations or vibrations of the vehicle itself which inevitably occur during its travel over all ordinary roads.

In carrying out my invention I employ a clock mechanism to impart motion to a chart or recording sheet divided conventionally by lines or marks corresponding to divisions of time. With this sheet a stylus of suitable character, such as the point of a pencil, remains in constant contact, and traces thereon a line of even or uniform character so long as the vehicle remains at rest. The support for the stylus is, however, movable with respect to the other parts of the device, as for example, by being pivoted to or suspended from the case of the instrument, and is either constructed in such manner itself, or provided with such an accessory part, as to be subject to a slight oscillatory motion transversely to the normal line of travel of the stylus over the paper while the vehicle is undergoing the vibrations incident to ordinary travel. Under these circumstances the line traced by the stylus will be broadened or zigzagged during the time when the vehicle is in motion so that an inspection of the chart will show at a glance the periods during which the vehicle has been in use.

In the practical embodiment of my invention certain details have been developed that contribute largely to its value and efficiency. These I will now describe by reference to the accompanying drawing.

Figure 1 is a view in side elevation of the complete instrument with a portion of the outer casing cut away. Fig. 2 is a front plan view of the recording, as distinguished from the clock mechanism, the view being a section on line $x$—$x$, Fig. 1, as viewed from the right. Fig. 3 is a view of the chart or recording sheet and a section of the device on line $y$—$y$ of Fig. 1, as viewed from the left. Fig. 4 is a detail of the stylus and its support.

The instrument, as illustrated in these drawings, is inclosed in a casing composed of two parts, A and B. The former is a cylindrical chamber containing the recording mechanism proper, and is adapted to be secured to the dash-board or other convenient part of the vehicle. The latter is a cylindrical casing containing a clock mechanism which imparts rotary motion to a disk C fitting over a central arbor D and keyed thereto in any suitable manner. By means of suitable gears $d$ the disk C is caused to make one complete revolution in twenty-four hours. A pin E is set in the face of the disk C at a short distance from its center for the purposes hereinafter set forth.

F is a circular sheet of card-board with radial lines corresponding to hours and fractions thereof, and provided with a central perforation to receive the central arbor D and a second perforation at a definite point for the pin E.

Within the casing A is secured a cross-bar H which affords a support for a rack bar J carrying two horizontal arms K and L at its ends through which arms the bar H passes loosely, so that the rack bar is movable freely along the bar H. A right angled lever M is pivoted to the bar H at m and carries at one end a spring actuated pawl N that engages with the teeth of the rack bar J. The other end of the lever M lies in the path of the pin E so as to be operated by the engagement of the pin, once during each revolution of the disk C, to lift the rack bar a space of one tooth. The lever M is retracted by a spiral spring O, and the rack bar is held in position by a leaf spring P acting as a pawl, so that when it is desired to lower the rack bar, it is necessary to release both pawls N and O by hand or by any convenient means.

To the arm K on the opposite side of the cross-bar H to the rack-bar, is pivoted at t a block or plate R, which is provided with a socket for holding a stylus which is preferably a pencil lead T, seated on a spiral spring S. Depending from this holder is a pendulum rod V carrying a bob W. Adjustable stops X are employed to limit the movement of oscillation of the pendulum.

The operation of the instrument is as follows: The clock being wound and a chart having been placed in position the casing which is usually hinged to the base portion A is closed and locked. This brings the stylus into contact with the paper the position of the rack bar being such as to bring this point of contact near the center of the chart. So long as the vehicle is at rest the stylus traces a uniform and fine line around the rotating chart, but as soon as the vehicle is set in motion and thereby subjected to vibration the pendulum is caused to undergo more or less irregular oscillations with the result that the stylus is vibrated transversely across its normal line of travel, tracing a wider or zig-zag line. At the end of twenty-four hours the rack bar is lifted one step and the line or point of contact of the stylus with the paper raised to a point nearer the periphery of the chart. It will now be seen that upon opening the case and inspecting the chart, it may be seen at once, during what periods for any number of days for which the instrument is designed to operate without rewinding, the vehicle has been in use. The character of the record will also afford an indication of the amplitude of vibration of the stylus and hence of the nature of the road over which the vehicle has traveled.

What I claim is:

1. The combination with a casing composed of two interlocking parts, a clock mechanism having a rotary support for a chart or record sheet which is rotated thereby, contained in one part, a stylus, a spring maintaining the same in engagement with the chart, and a pendulous support for the stylus arranged to vibrate in a plane parallel to the record sheet, contained in the other part of the casing, these devices being arranged so that the stylus will be oscillated transversely to the normal line of travel of the chart by the vibrations of the casing incident to the ordinary running of a vehicle to which it may be attached.

2. The combination with a casing composed of two interlocking parts, of a clock mechanism having a rotary support for a chart or record sheet which is rotated thereby, contained in one part, a stylus adapted to bear on the chart or record sheet, and a pendulous support for the stylus arranged to vibrate in a plane parallel to the record sheet, contained in the other part of the casing, these devices being arranged so that the stylus will be oscillated transversely to the normal line of travel of the record sheet by the vibration of the casing incident to the ordinary running of a vehicle to which it may be attached; and means actuated by the clock mechanism to adjust the stylus-support radially of the rotary record sheet.

3. The combination with a casing composed of two interlocking parts, of a clock mechanism having a rotary support for a chart or record sheet which is rotated thereby, contained in one part, a stylus adapted to bear normally on the record sheet, a radially adjustable pendulous support for the stylus arranged to vibrate in a plane parallel to the record sheet, contained in the other part of the casing and provided with a ratchet-rack, these devices being arranged so that the stylus will be oscillated transversely to the normal line of travel of the chart by the vibrations of the casing incident to the ordinary running of a vehicle to which it may be attached; a pawl associated with said stylus-support and operatively engaging the ratchet-rack, a spring connected with said pawl for actuating the same to shift the said support radially, and means driven by the clock mechanism for causing the spring to actuate the pawl and shift the stylus-support at predetermined intervals.

CHARLES A. MILLER.

Witnesses:
CHAS. H. CRELLIN,
FLORENCE M. LOVATT.